United States Patent
Amartey-Tagoe et al.

(10) Patent No.: US 12,410,013 B1
(45) Date of Patent: Sep. 9, 2025

(54) AUTOMATED CAPACITY RECOMMENDATION ENGINE FOR SHIPPING NETWORKS

(71) Applicant: Amazon Technologies, Inc., Seattle, WA (US)

(72) Inventors: Edward King Armah Amartey-Tagoe, Seattle, WA (US); Michael Behrman, Roswell, GA (US); Vibhor Kaushik, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 934 days.

(21) Appl. No.: 17/188,514

(22) Filed: Mar. 1, 2021

(51) Int. Cl.
    *B65G 1/137*    (2006.01)
    *G06Q 10/0631*  (2023.01)
    *G06Q 10/083*   (2024.01)

(52) U.S. Cl.
    CPC ..... *B65G 1/1373* (2013.01); *G06Q 10/06312* (2013.01); *G06Q 10/0838* (2013.01)

(58) Field of Classification Search
    CPC ........... B65G 1/1373; G06Q 10/06312; G06Q 10/0838; G06Q 50/30
    See application file for complete search history.

(56) References Cited

U.S. PATENT DOCUMENTS

| | | | |
|---|---|---|---|
| 9,463,927 B1 * | 10/2016 | Theobald | B65G 1/1373 |
| 11,055,655 B1 * | 7/2021 | Neumann | G06Q 10/08355 |
| 11,080,645 B1 * | 8/2021 | Kreuz | G06Q 10/08345 |
| 2014/0019189 A1 * | 1/2014 | Linton | G05B 19/418 |
| | | | 705/7.25 |

(Continued)

FOREIGN PATENT DOCUMENTS

JP     6710090 B2 *  6/2020

OTHER PUBLICATIONS

A. Belotserkovsky, P. Lukashevich, M. Doganli and J. Rabcan, "A Concept of a Multi-robotic System for Warehouse Automation," 2021 International Conference on Information and Digital Technologies (IDT), Zilina, Slovakia, 2021, pp. 156-161, doi: 10.1109/IDT52577.2021.9497581. (Year: 2021).*

*Primary Examiner* — Resha Desai
*Assistant Examiner* — Danielle Elizabeth Zevitz
(74) *Attorney, Agent, or Firm* — Kilpatrick Townsend & Stockton LLP

(57) ABSTRACT

Techniques for generating a capacity recommendation engine are described herein. First information that identifies capacity changes associated with shipping packages from one or more entities may be obtained. Each capacity change may be associated with a reason code that identifies a reason for the capacity change. Second information that identifies uncontrollable event data for one or more geographic areas that correspond to a delivery area for the one or more entities may be received. Historical information that includes historical capacity changes and associated reason codes from the one or more entities may be obtained. A machine learning algorithm may be implemented based on the first information, the second information, and the historical information. A recommendation may be generated for an entity using the machine learning algorithm. The recommendation may include a modification of a component associated with the shipping network of the entity for a future time period.

18 Claims, 11 Drawing Sheets

(56) References Cited

U.S. PATENT DOCUMENTS

| | | | |
|---|---|---|---|
| 2014/0351095 A1* | 11/2014 | Krishnamurthy | G06Q 30/0635 |
| | | | 705/26.81 |
| 2018/0068255 A1* | 3/2018 | Hance | G06Q 10/087 |
| 2020/0112555 A1* | 4/2020 | Brown | H04L 63/083 |
| 2020/0134545 A1* | 4/2020 | Appel | G06Q 10/04 |
| 2021/0133650 A1* | 5/2021 | Cella | G06Q 10/0637 |
| 2021/0209181 A1* | 7/2021 | Rehn | G06Q 10/087 |
| 2021/0272037 A1* | 9/2021 | Hanebeck | G06Q 10/08 |
| 2021/0304133 A1* | 9/2021 | Anandam | G06N 20/00 |

\* cited by examiner

| Web Browser 702 | _ 🗗 ✕ |
|---|---|
| FILE EDIT VIEW FAVORITES TOOLS HELP | |
| Address | ▽ → GO |

Tactical Cap Adjustment

704
> Central Input
> Labor Orders
> Shift Planning
∨ Tactical Cap
    Cap Adjustment
    Cap Status Report
> Scheduling Tool

Station Information 706

| Delivery Station | Station 1 ▽ | 700 |
|---|---|---|
| Cap Initiated By | Select ▽ | |
| Country: | US | |
| Region: | North East | |
| State – City: | PA - Bethlehem | |

CAP Request 708

| Delivery Date | Original Soft Cap | New Cap 712 |
|---|---|---|
| 2020-12-06 | 0 | 0 |

Request Details

☐ Safety ☐ Mechanical Failure ☐ Elevated Origin Capacity Increase ☐ Attendance
☒ Weather/Environmental ☐ Capacity Increase

Tactical CAP Adjustment Detail 714

Weather/Environmental ← 716

Volume Impact:
CO Weather Tier:
Weather Forecast Link: 718
Details:

AUTOMATED CAPACITY RECOMMENDATION ENGINE FOR SHIPPING NETWORKS

BACKGROUND

Warehouses, brick-and-mortar stores, online marketplaces, and other entities may engage with carriers to transport items to customers over a large geographical area. Transportation entities may utilize conventional route planning engines which develop routes for delivery vehicles to delivery packages to delivery locations. Conventional route planning engines may also generate predicted capacity limitations which indicate an amount of packages that can be processed by a facility or location for a certain time period. However, these route planning engines fail to properly communicate capacity changes to other transportation entities within a transportation network when unexpected events occur, such as a catastrophic weather event. Further, conventional route planning engines fail to learn from and predict capacity changes due to expected events. The lack of visibility and communication between carriers to account for changes in capacity can result in delays in shipment, loss of items, or underutilized capacity that could otherwise be utilized to account for certain events.

BRIEF DESCRIPTION OF THE DRAWINGS

Various embodiments in accordance with the present disclosure will be described with reference to the drawings, in which:

FIG. 7 illustrates an example user interface for a capacity recommendation feature, in accordance with at least one embodiment;

DETAILED DESCRIPTION

Figure 1:
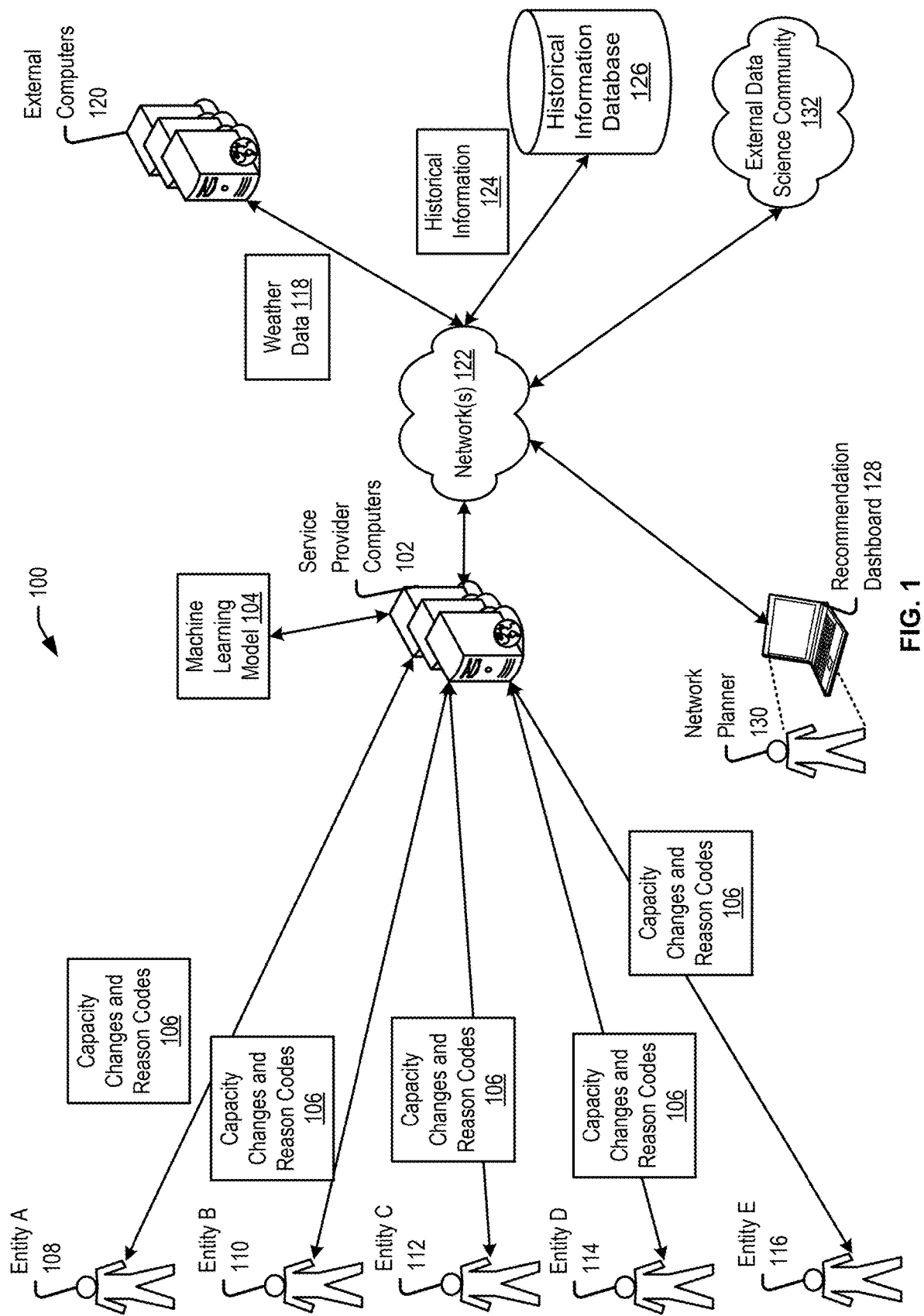
FIG. 1 illustrates a workflow for a capacity recommendation feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a capacity recommendation feature for analyzing capacity changes made by entities of shipping networks, historical capacity changes made by the entities, and other data such as uncontrollable event data, to generate recommendations to modify components of a shipping network to mitigate differences between an expected capacity for a given time period and a predicted capacity for the same time period. Capacity may refer to a transportation capacity which may serve as the main lever to control the transportation capacity constraints in a supply chain. Each transportation carrier of a transportation network may have a maximum number of packages they can process in their own network for a given processing or delivery day. Capacity may include any portion or component of the transportation network including sorting capacity, personnel assignment, mechanical limitations at facilities, such as fulfillment centers, and emergency site shutdowns. In accordance with at least one embodiment, the capacity recommendation feature may be configured to generate a user interface which can present the generated recommendations as well as enable an entity to view the impact of capacity changes made by other entities on their own shipping network, other shipping networks, as well as to specific components of the network either upstream or downstream. In embodiments, the capacity recommendation feature may be implemented by service provider computers that are in communication with the entities responsible for delivering a large number of packages to various geographic areas. The service provider computers may train and implement a machine learning algorithm that is configured to utilize real-time submissions of expected capacity requirements by an entity, as well as capacity changes, historic capacity requirement submissions and changes, and uncontrollable event data to identify trends and correlations between certain factors of capacity changes and reason codes and the effect on other entities for a given time period. For example, the machine learning algorithm may be configured to generate recommendations which may include modifications to capacity requirements for certain entities to absorb the loss of capacity by another entity or to meet the demands for capacity in a future time period based on historical analysis and other factors.

Conventional shipping entities that work together to cover a large geographic area may not communicate to each other, or communicate in a timely manner, when changes to capacity are required due to controllable or uncontrollable events. Controllable events include events which are caused by some component which may be foreseeable such as equipment in a facility that continues to fail. An uncontrollable event may include an event that is not controllable and may be unpredictable such as severe weather events (tornadoes) or earthquakes. In embodiments, uncontrollable event data may include information about weather conditions (referred to as weather information herein), as well as other information associated with other uncontrollable events or transient events occurring in a geographic area such as riots, earthquakes, flooding, or construction. As the entities don't communicate to one another, a change in capacity by one entity may result in an unexpected increase or decrease felt by another entity. This can result in underutilized or over utilized components of a shipping network that is affected by the capacity changes from another shipping network. Even within a single shipping network and associated entity, the entity may not analyze historic capacity estimations, changes, or factors to predict future capacity requirements thereby generating requirements that are different from a predicted requirement generated by a trained machine learning algorithm. The systems and methods described herein address these issues by obtaining capacity changes, associated reason codes, and other information such as weather information, to communicate capacity changes among entities and their shipping network as well as recommendations to modify capacity requirements for a given time period (such as a future time period). By analyzing submitted capacity changes as well as historic capacity changes, the machine learning algorithm can generate improved forecast accuracy as to the capacity requirements for a given entity during the time period. For example, a certain entity may submit an estimated capacity for a future time period (e.g., next week) of 2 million packages. The capacity recommendation feature described herein may analyze the capacity estimations, capacity changes, historic information, and weather information to determine that a predicted capacity of 2.5 million packages is more accurate. As a result of such a prediction, the capacity recommendation feature may generate recommendations and notifications to the entity as well as other entities to optimize usage of the shipping networks to cover the potential increase in capacity for the entity or the geographic area served by the entity.

In accordance with at least one embodiment, the capacity recommendation feature may be able to generate recommendations which include modifications to specific components within a shipping network to account for capacity changes or to ensure compliance with a predicted capacity. For example, a shipping network may include multiple facilities, such as a fulfillment center, a sorting center, intermediary delivery stations, various transportation entities (ground or air), as well as machines and computers associated with each entity (e.g., autonomous mobile robots of a fulfillment center, user devices of delivery entities, etc.,). Another problem with conventional routing systems or shipping networks in general is that even if capacity changes could be openly communicated between entities, the specific levers or components to modify within a shipping network to comply with a new capacity requirement may be undetermined. In embodiments, the service provider computers implementing the machine learning algorithm may be configured, using the machine learning algorithm, to generate a recommendation that not only identifies the change in capacity requirement but also the specific components to modify to ensure compliance. For example, the service provider computers may generate and transmit instructions which modify the routes or lanes used by ground vehicles (delivery entities) as they deliver packages within a geographic area to ensure that the shipping network for the entity complies with the predicted capacity change.

In accordance with at least one embodiment, the capacity recommendation feature implemented by the service provider computers may be configured to utilize the output of the machine learning algorithm to generate and provide a user interface (network viewer) which can be presented on computer devices of entities. The user interface may be used to present visualizations, trends, and the generated recommendations for capacity changes in a network dashboard. For example, users (entities) may be able to view, via the user interface, the health of the network of the total shipping networks of all entities for a geographical area. The user interface may present a score or grade to help team leaders associated with each entity understand how their own network and other shipping networks are performing. A breakdown of controllable and non-controllable capacity change causes may be identified and presented for each entity. Entities may be able to submit queries to understand the root case for a capacity change or a source (e.g., which shipping network) of the capacity change for a time period.

The user interface may also be configured to visualize the impact of capacity changes upstream or downstream within their own shipping network or other shipping networks. Notifications of changes required to comply with a predicted capacity change may also be presented via the user interface. The user interface may be configured to receive input from entities such as submissions for capacity changes, reason codes associated with the capacity change, text descriptions explaining why the capacity change is occurring, dates when the capacity change occurred as well as other information. In accordance with at least one embodiment, the service provider computers may use a natural language algorithm to analyze the text description for a capacity change to parse out reason codes as well as assign weights to the reason codes which represent the importance or impact of the reason code to the capacity change. The service provider computers may maintain and update a database that includes the collected information for the shipping networks and entities (e.g., capacity changes, reason codes, historical capacity changes and reason codes, and weather information). The service provider computers may grant access to the database to data science teams for further analysis. The service provider computers may generate a data object such as a data stream which data science teams may be granted access to for further analysis and capacity recommendations.

FIG. 1 illustrates a workflow for a capacity recommendation feature, in accordance with at least one embodiment. The workflow 100 of FIG. 1 includes service provider computers 102 training and implementing a machine learning model 104. The service provider computers 102 may obtain capacity changes and associated reason codes for the capacity changes 106 from one or more different entities 108-116. The capacity changes and reason codes 106 may also include estimated capacity requirements for a time period including a future time period submitted by each entity (108-116). As described above, conventionally each team member (entity) may have submitted capacity changes and reason codes to a system that was not centralized or communicated with other team members. In such a scenario, other team members were denied access to critical information, or were provided the information in an untimely manner, that adjustments to capacity requirements were often unable to be made to produce an effective result. Lack of communication as well as analyzing of capacity changes and associated reason codes can lead to entities committing the same mistakes that could lead to future capacity constraints on other entities as well as an overall reduction in package delivery for a geographic area(s) and under or over utilizing of resources and components within shipping networks.

The workflow 100 includes the service provider computers 102 receiving weather data 118 from external computers 120 via networks 122. The external computers 120 may be third party computers. The weather data 118 may include real time and historical weather information for geographic areas associated with each entities' shipping network. The real time and historical weather information may include current and historic weather conditions as well as predicted weather conditions for the geographic areas. The workflow 100 depicts the service provider computers 102 obtaining historical information 124 from a historical information database 126 via networks 122. In embodiments, the historical information 124 may include historically submitted estimated capacities, historically submitted capacity changes, and associated reason codes from entities 108-116. The historical information 124 may include other historic and real time information such as transportation routes, number of packages, and current capacity requirements utilized or associated with entities 108-116. It should be noted that although FIG. 1 depicts the service provider computers obtaining the weather data 118 and historical information 124 via networks 122, embodiments where the service provider computers 102 may obtain such information internally or absent communications via external entities are also included in the present disclosure.

The service provider computers 102 may be configured to train and implement the machine learning model 104 (machine learning algorithm) using the capacity changes and reason codes 106, the weather data 118, and the historical information 124. In accordance with at least one embodiment, the machine learning model 104 may be configured to identify discrepancies between submitted estimated capacity requirements for a time period and predicted capacity requirements for an entity such as entity 108. For example, entity A 108 may have submitted an estimated capacity of 100,000 packages for a future time period (e.g., next week). However, the machine learning model 104 may analyze the capacity changes and reason codes 106 from the other entities 110-116, the weather data 118, and historical information 124 to determine a predicted capacity of 200,000 packages for the future time period. In response to such discrepancies, the service provider computers 102 may generate and transmit instructions to modify a component of the shipping network for entity A 108 to comply with the predicted capacity as well as generate recommendations to the other entities 110-116 to account for the predicted increase in capacity for entity A 108. In embodiments, the instructions may be transmitted to an entity computer or user device associated with an entity, facility, or component which may be implemented to modify the behavior, routes utilized, or operating parameters for the component. A notification of the discrepancy and any recommendations may also be provided, via a user interface, which is generated by the service provider computers 102 and provided via a recommended dashboard 128 to a network planner 130 via networks 122.

In embodiments, the machine learning model 104 may be configured to determine particular components to modify to account for changes in capacity for each entity (108-116) as well as generating instructions for modifying the components. In conventional systems, even if team members of a shipping network knew that a change in capacity is to be expected they lack the total network vision to determine how to account for the change in capacity. For example, as will be discussed in further detail below with reference to FIGS. 2-5, each entity may be associated with a shipping network comprised of a number of different components including facilities, delivery entities, transports, and machines such as sorters and autonomous mobile robots. Simply indicating that a shipping network should expect more packages does not account for the specific thresholds or capacity requirements that each component can change to account for an increase or decrease in capacity. As such, the systems and methods described herein can provide for greater accuracy in enabling entities to properly conform to an expected increase or decrease in capacity while optimizing usage of associated components.

The machine learning model 104 and the service provider computers 102 may be configured to generate a user interface, which may be referred to as a network viewer or recommendation dashboard 128, for presentation via a user device to a user such as a network planner 130 associated with an entity (e.g., entity E 116). The user interface may be configured to present notifications of discrepancies between an estimated capacity, submitted capacity, and a predicted capacity, recommendations (including specific modification instructions) for updating the capacity requirements for a certain time period including a future time period, and other information. For example, users (e.g., entities 108-116) may be able to view the health of their own shipping network, the health of other shipping networks, identified trends, sources of capacity changes as well as whether the capacity change is associated with a controllable event or an uncontrollable event. Entities 108-116 may be able to submit the capacity changes and reason codes 106 as well as other information such as text descriptions for the capacity change via the user interface or recommendation dashboard 128.

By visualizing such information the network planner 130 may be able to more accurately understand which parts of a shipping network need to be adjusted or helped to cope with a change in capacity. Moreover, the user interface enables the network planners of multiple entities to properly communicate or be informed when other entities or team members make unexpected capacity changes. The machine learning model 104 may be configured to generate a report, presented via the recommendation dashboard 128, which indicates the likelihood that a given entity will be able to execute their expected plans (capacity requirements) for a time period such as a given week. The service provider computers 102 may be configured to generate a data object such as records maintained in a database or a data stream that includes the obtained or received information analyzed by the machine learning model 104 as well as the output of the machine learning model 104. Access to the database or data stream may be granted, via networks 122, to one or more external data science community teams 132 for further analysis.

Figure 2:
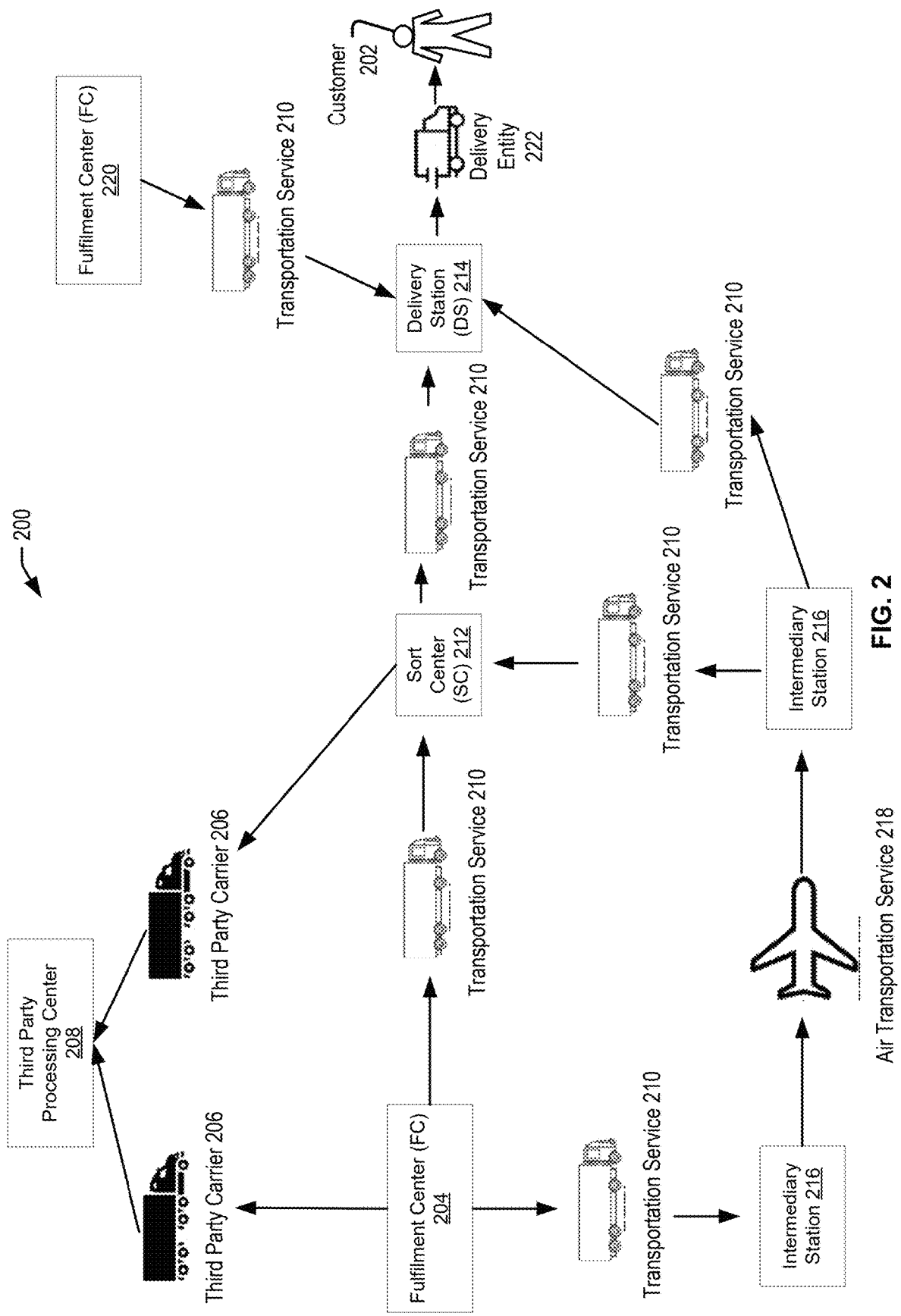
FIG. 2 illustrates an example transportation network, in accordance with at least one embodiment.

FIG. 2 illustrates an example transportation network, in accordance with at least one embodiment. FIG. 2 depicts an example transportation network 200 that includes multiple components which may comprise a shipping network associated with an entity to deliver packages to a customer 202. It should be noted that each component in the example transportation network 200 may be compromised of one or more additional components. For example, the fulfillment center 204 may include personnel assignment, sorting machines, autonomous mobile robots, and transportation vehicles which may serve as components of the fulfillment center 204. As discussed above and with further detail below with reference to FIGS. 3-5, the service provider computers implementing the machine learning algorithm may generate instructions for components of a shipping network at any level. For example, instructions may be generated for fulfillment center 204 which indicate an expected increase to capacity by 10,000 packages. Other example instructions may be more specific for the fulfillment center 204 and identify specific sorting machines which should be expected to each process an increased amount of packages to account for the increased capacity requirement predicted by the machine learning algorithm.

The example transportation network 200 depicted in FIG. 2 may include one or more third party carriers 206 for moving packages to a third party processing center 208. In accordance with at least one embodiment, the service provider computers implementing the capacity recommendation features described herein may generate and provide instructions to third party entities, such as third party carriers operating a third party processing center 208 to modify components and account for changes in expected capacity of packages to deliver. The example transportation network 200 depicts multiple transportation service 210 vehicles being used to move packages between the fulfillment center 204, a sort center 212, a delivery station 214, and from one or more intermediary stations 216. In embodiments, the transportation network 200 may include air transportation service 218 for moving packages between components of the shipping network such as between intermediary stations 216.

Example transportation network 200 depicts a different fulfillment center 220 also providing packages, via transportation service 210 vehicles to delivery station 214. Delivery entity 222 may provide packages for delivery to customer 202 via delivery station 214. As described herein and with more specific examples in FIGS. 3-5, instructions generated and transmitted by the service provider computers may be provided to specific components of the example transportation network to adjust behavior, parameters, or functionality to account for changes in capacity to a shipping network. For example, delivery entity 222 may include a driver with a user device that includes a carrier application. The service provider computers may generate and transmit instructions which are implemented by the carrier application change the routes utilized by the delivery entity 222 to deliver packages to customers such as customer 202. Instructions may be provided to air transportation service 218 which adjusts the time that the service leaves one intermediary station 216 or the amount of packages that are loaded onto the airplane. Shipping networks include a number of levers (components) that can be adjusted to comply with adjusted capacity requirements and the service provider computers can utilize the machine learning algorithm to identify the correct components to utilize to adjust for the capacity requirements more accurately and with increased efficiency than could be accomplished by a network planner associated with an entity given the same information.

Figure 3:
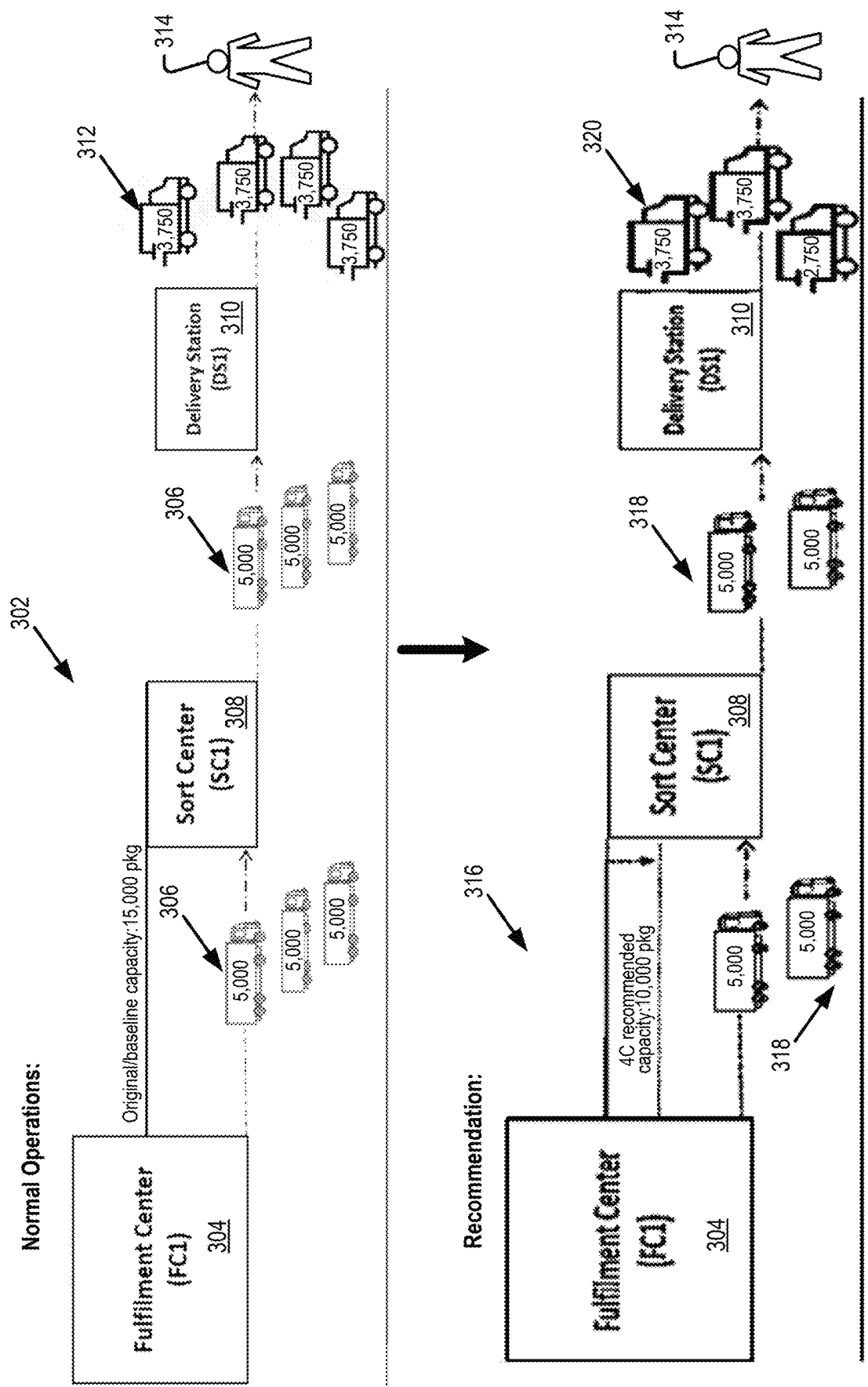
FIG. 3 illustrates an example recommendation scenario generated by the capacity recommendation feature, in accordance with at least one embodiment.

FIG. 3 illustrates an example recommendation scenario generated by the capacity recommendation feature, in accordance with at least one embodiment. FIG. 3 depicts components of a shipping network operating under normal conditions or operations at 302. The normal operations 302 scenario includes fulfilment center 304 with an expected capacity of 15,000 packages being transported by three transportation service vehicles 306 to sort center 308 and delivery station 310. Delivery entities 312 may utilize four vehicles to deliver the packages to customers 314. The delivery entities 312 may utilize four vehicles with each vehicle carrying 3,750 packages to account for the expected capacity of 15,000 packages. In embodiments, the machine learning algorithm implemented by the service provider computers may determine that the particular fulfilment center 304 and downstream components should reduce their capacity to processing 10,000 packages instead of the expected capacity of 15,000 packages to optimize usage of the components while ensuring a positive customer experience.

FIG. 3 also depicts the same components of the shipping network utilizing the recommendation 316 and instructions to adjust and modify the components to deliver a predicted amount of packages to customers 314. For example, in the depicted recommendation scenario 316, the fulfillment center 304 may utilize only two transportation service vehicles 318 to transport 10,000 packages worth of capacity to sort center 308 and delivery station 310. Further modifications may be necessary to optimize usage of the components in recommendation scenario 316 such as reducing the number of delivery entities 320 to three vehicles instead of the four vehicles utilized in the normal operations 302 scenario. The delivery entities 320 may also carry a different amount of packages, for example one vehicle may transport only 2,750 packages, to optimize usage of the vehicle within the shipping network to deliver packages to the customers 314. As described herein, the service provider computers may generate and transmit instructions to various components of a shipping network to comply with the predicted capacity generated by the machine learning algorithm. For example, instructions may be provided to devices of transportation service vehicles 318 to load and transport a different number of packages than was originally expected from fulfillment center 304.

Figure 4:
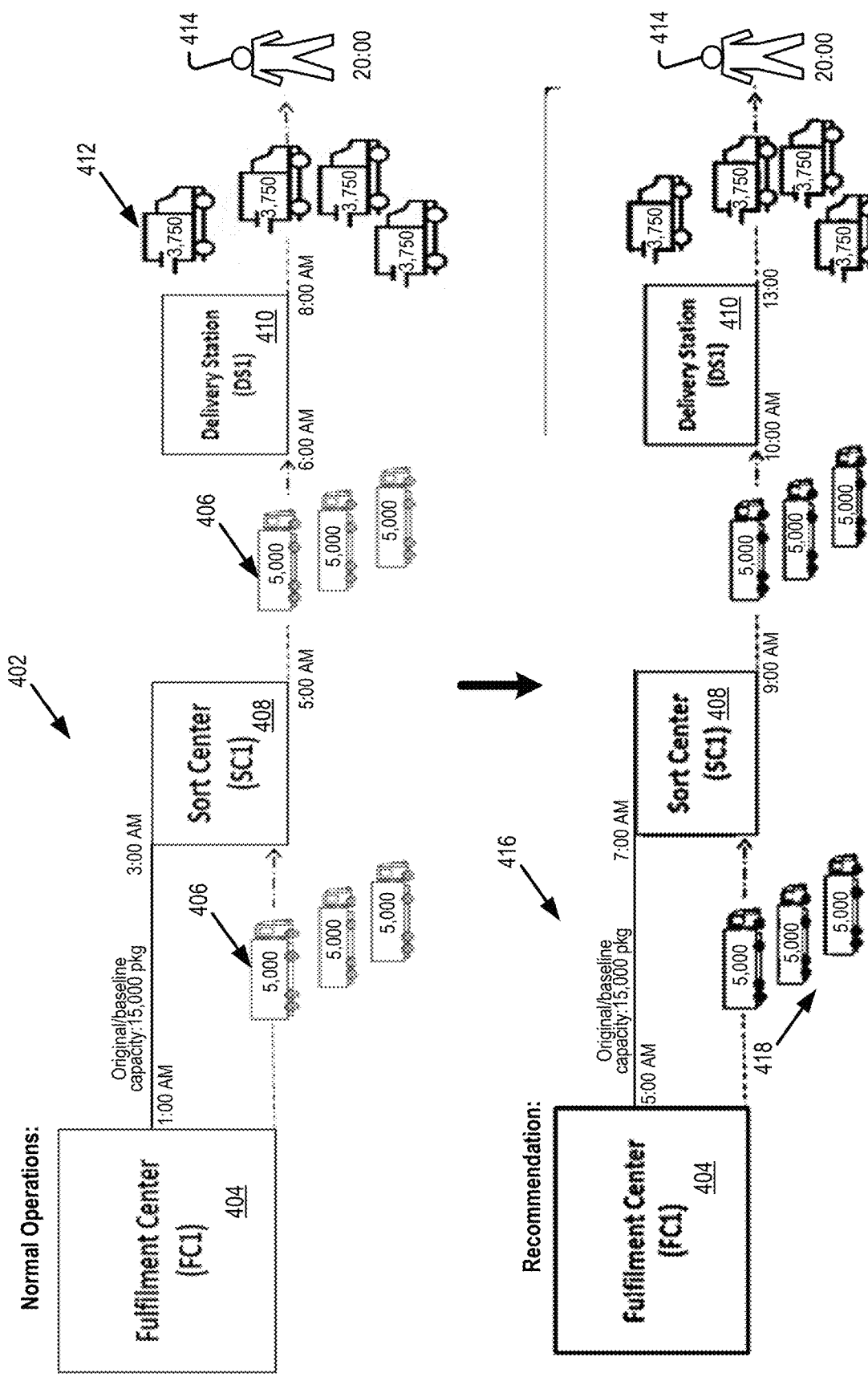
FIG. 4 illustrates an example recommendation scenario generated by the capacity recommendation feature, in accordance with at least one embodiment.

FIG. 4 illustrates an example recommendation scenario generated by the capacity recommendation feature, in accordance with at least one embodiment. FIG. 4 depicts components of a shipping network operating under normal conditions or operations at 402. The normal operations 402 scenario includes fulfilment center 404 with an expected critical pull time and critical entry time and an expected capacity of 15,000 packages being transported by three transportation service vehicles 406 to sort center 408 and delivery station 410. The transportation service vehicles 406 may be instructed to leave the fulfilment center 404 and sort center 408 at certain times to arrive at the delivery station 410 by a certain time. Delivery entities 412 may utilize four vehicles to deliver the packages to customers 414 by a certain time (20:00). The delivery entities 412 may utilize four vehicles with each vehicle carrying 3,750 packages to account for the expected capacity of 15,000 packages and may leave at a certain expected time to complete all deliveries by 20:00. In embodiments, the machine learning algorithm implemented by the service provider computers may determine the critical pull times and entry times utilized by the transportation service vehicles 406 and delivery entities 412 to optimize usage of the components while ensuring a positive customer experience.

FIG. 4 also depicts the same components of the shipping network utilizing the recommendation 416 and instructions to adjust and modify the components to deliver a predicted amount of packages to customers 414 by the certain time. For example, in the depicted recommendation scenario 416, the fulfillment center 404 may adjust the critical pull times and entry times, as well as the sort center, and delivery station to transport 15,000 packages worth of capacity to customers 414 by 20:00. Further modifications may be necessary to optimize usage of the components in recommendation scenario 416 such as by changing the critical pull time and entry time differently at each location within the recommendation scenario 416. For example, a difference of four hours may be applied to the critical pull times and entry times at the fulfillment center 404 while only a difference of two hours is utilized at sort center 408. As described herein, the service provider computers may generate and transmit instructions to various components of a shipping network to comply with the predicted capacity generated by the machine learning algorithm. For example, instructions may be provided to devices of transportation service vehicles 418 to load and transport the number of packages at different times than previously expected. The service provider computers may generate and transmit such instructions to the components of the shipping network with ample time to implement such changes in order to optimize usage of the components and comply with the predicted capacity change that is different from the expected capacity of the normal operations scenario 402.

Figure 5:
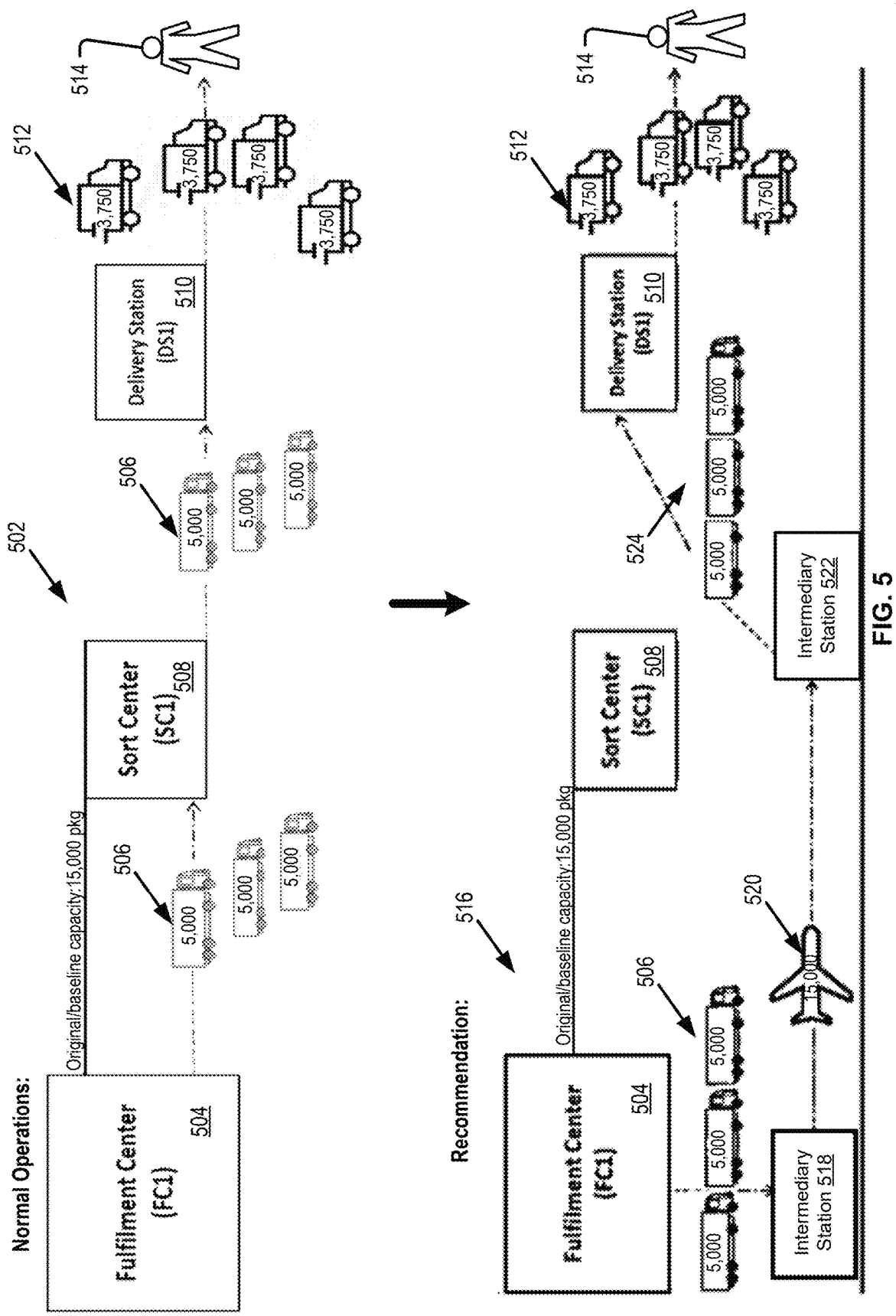
FIG. 5 illustrates an example recommendation scenario generated by the capacity recommendation feature, in accordance with at least one embodiment.

FIG. 5 illustrates an example recommendation scenario generated by the capacity recommendation feature, in accordance with at least one embodiment. FIG. 5 depicts components of a shipping network operating under normal conditions or operations at 502. The normal operations 502 scenario includes fulfilment center 504 with an expected capacity of 15,000 packages being transported by three transportation service vehicles 506 to sort center 508 and delivery station 510. Delivery entities 512 may utilize four vehicles to deliver the packages to customers 514. The delivery entities 512 may utilize four vehicles with each vehicle carrying 3,750 packages to account for the expected capacity of 15,000 packages. In embodiments, the machine learning algorithm implemented by the service provider computers may determine that the particular fulfilment center 504 and downstream components should utilize different routes and delivery entities to deliver the same 15,000 packages to delivery station 510 and eventually customers 514.

FIG. 5 also depicts the same components of the shipping network utilizing the recommendation 516 and instructions to adjust and modify the components to deliver a predicted amount of packages to customers 514 via different routes or using different delivery entities. For example, in the depicted recommendation scenario 516, the transportation service vehicles 506 may receive different route instructions which cause them to transport the 15,000 packages from fulfillment center 504 to intermediary station 518. Further modifications may be necessary to optimize usage of the components in recommendation scenario 516 such as by generating and transmitting instructions for usage of an airplane delivery entity 520 to transport the 15,000 packages from intermediary station 518 to intermediary station 522. In embodiments, an intermediary station may include a Gateway or airport that is associated with the transportation of items via an airplane to another Gateway, airport, or other suitable destination. The service provider computers may generate and transmit instructions for transportation service vehicles 524 to transport the 15,000 packages from intermediary station 522 to delivery station 510 for eventual delivery by delivery entities 512 to customers 514. As described herein, the service provider computers may generate and transmit instructions to various components of a shipping network to comply with the predicted capacity generated by the machine learning algorithm. For example, instructions may be provided to devices of transportation service vehicles 506 and 524 to load and transport the packages to different destinations within the shipping network as well as utilize different types of vehicles or utilize different routes or lanes to deliver the packages between destinations.

Figure 6:
FIG. 6 illustrates an example user interface for a capacity recommendation feature, in accordance with at least one embodiment.

FIG. 6 illustrates an example user interface for a capacity recommendation feature, in accordance with at least one embodiment. FIG. 6 depicts user interface 600 which includes various input fields and objects which a user may interact with via an input/output device to submit a capacity change and reason code. The user interface 600 of FIG. 6 is presented via a web browser 602, however, it should be noted that embodiments disclosed herein include embodiments where the user interface 600 is presented via an application which may be native to a user device or installed on a user device (e.g., a carrier application of a delivery entity). Users, such as network planners associated with an entity with a shipping network, can submit details for a capacity change. Users can also submit estimated capacities for a given time period. In accordance with at least one embodiment, users can provide plain text descriptions via description 604, which explains the reason why a capacity change is required for the shipping network.

In embodiments, the service provider computers implementing the capacity recommendation feature may obtain the input provided in the description field 604 of the user interface. The input may be parsed by an implemented natural language algorithm for words or phrases that are similar to supported reason codes. For example, a user may submit a text description that says "loss of capacity due to tornado in area." The natural language algorithm may parse the text to identify the word "tornado" and determine that a weather related reason code is appropriate for the capacity change. In accordance with at least one embodiment, the service provider computers may utilize the natural language algorithm, or another algorithm, to associate a weight to the determined reason code. The weight associated with a reason code may indicate the importance or potential impact of the reason code to estimated or predicted capacity requirements for a shipping network. For example, a weather reason code that corresponds to light snow may be assigned a lower weight than a weather reason code that corresponds to an earthquake. Other fields or user interface objects may be included in user interface 600 such as a an object for creating a new capacity change proposal 606, create a new project 608, a name 610 associated with the request, a notification list 612 for parties to notify of the capacity change, and a selection of parties to review the request at 614.

FIG. 7 illustrates an example user interface for a capacity recommendation feature, in accordance with at least one embodiment. The user interface 700 of FIG. 7 may be generated and updated by the service provider computers implementing the capacity recommendation features described herein. The user interface 700 may be referred to as a recommendation dashboard. The user interface 700 of FIG. 7 may be generated and transmitted to user devices of users such as administrators or network planners associated with an entity of a shipping network. The user interface 700 may be an example of a user interface that is configured to enable users to efficiently request or submit capacity changes and associated reason codes. The user interface 700 is presented in FIG. 7 via a web browser 702, however, it should be noted that embodiments disclosed herein include embodiments where the user interface 700 is presented via an application which may be native to a user device or installed on a user device (e.g., a carrier application of a delivery entity).

The user interface 700 of FIG. 7 includes a navigation panel 704 for navigating to different aspects of the user interface 700 such as a user interface aspect for shift planning or a scheduling tool. The user interface 700 may include a portion for submitting station information 706 which indicates a particular facility or component within a shipping network that is requesting a capacity change. In embodiments, the user interface 700 may include a capacity request portion 708 which includes input fields associated with a capacity change request such as an expected delivery date, an original soft capacity, and a new expected capacity. The user interface 700 may include a portion or section that includes request details 710 where users can select from one or more pre-determined capacity change reason codes 712. For example, in FIG. 7, a user has selected "Weather/Environmental" as a reason from the reason codes 712 to associate with the capacity change request. The user interface 700 may also include a section or portion for capacity change adjustment detail 714. The capacity change adjustment detail 714 portion of user interface 700 may provide an indication 716 of the selected reason 712 as well as a further input field 718 for providing more details associated with the selected reason 712. For example, the input field 718 of user interface 700 depicted in FIG. 7 includes several fields having to do with the weather as the selected reason 712 is "Weather/Environmental." Other input fields or user interface objects may be included to help optimize a user submitting the capacity change request and reason code.

Figure 8:
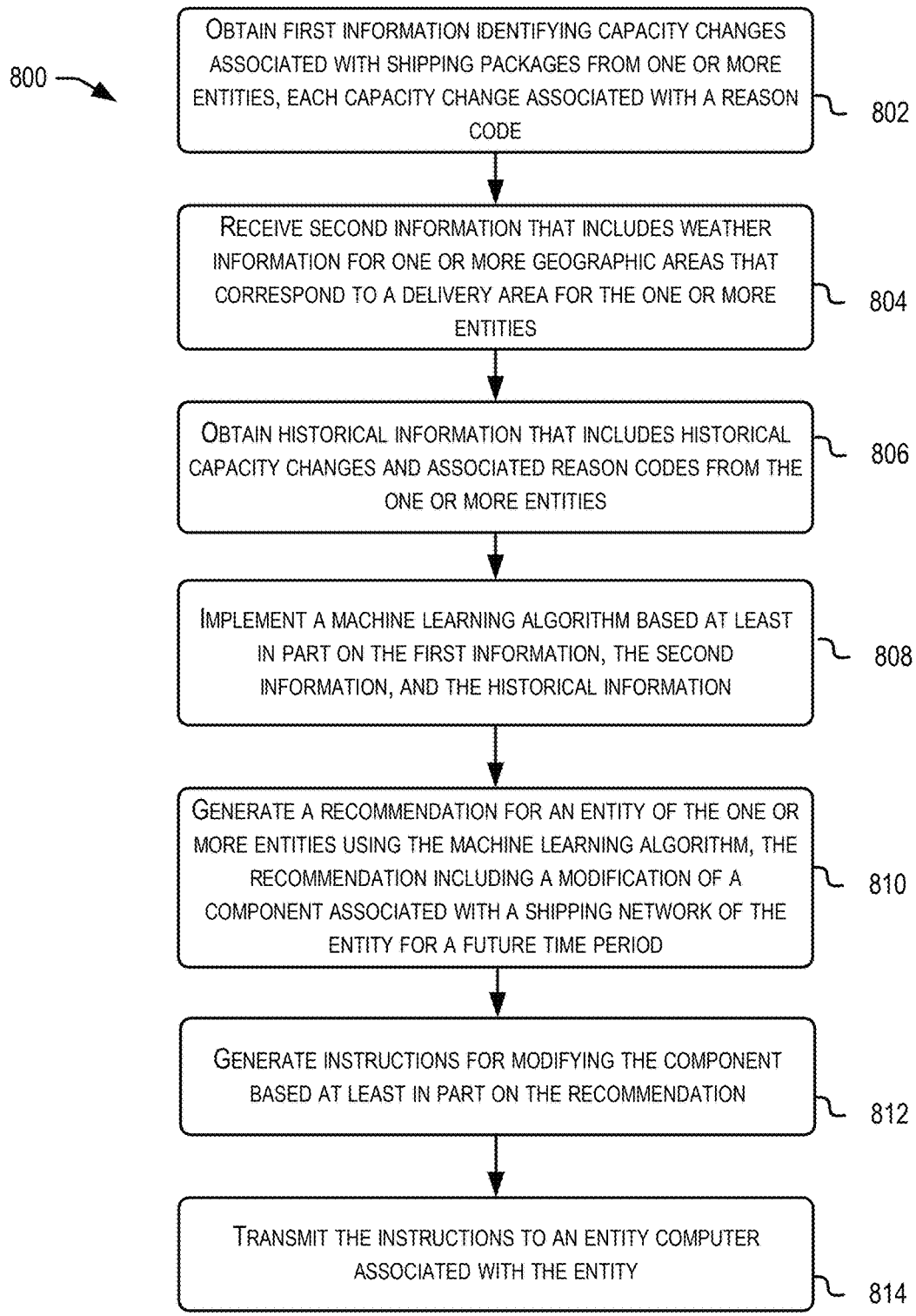
FIG. 8 illustrates an example flow diagram for a capacity recommendation feature, in accordance with at least one embodiment.
Figure 9:
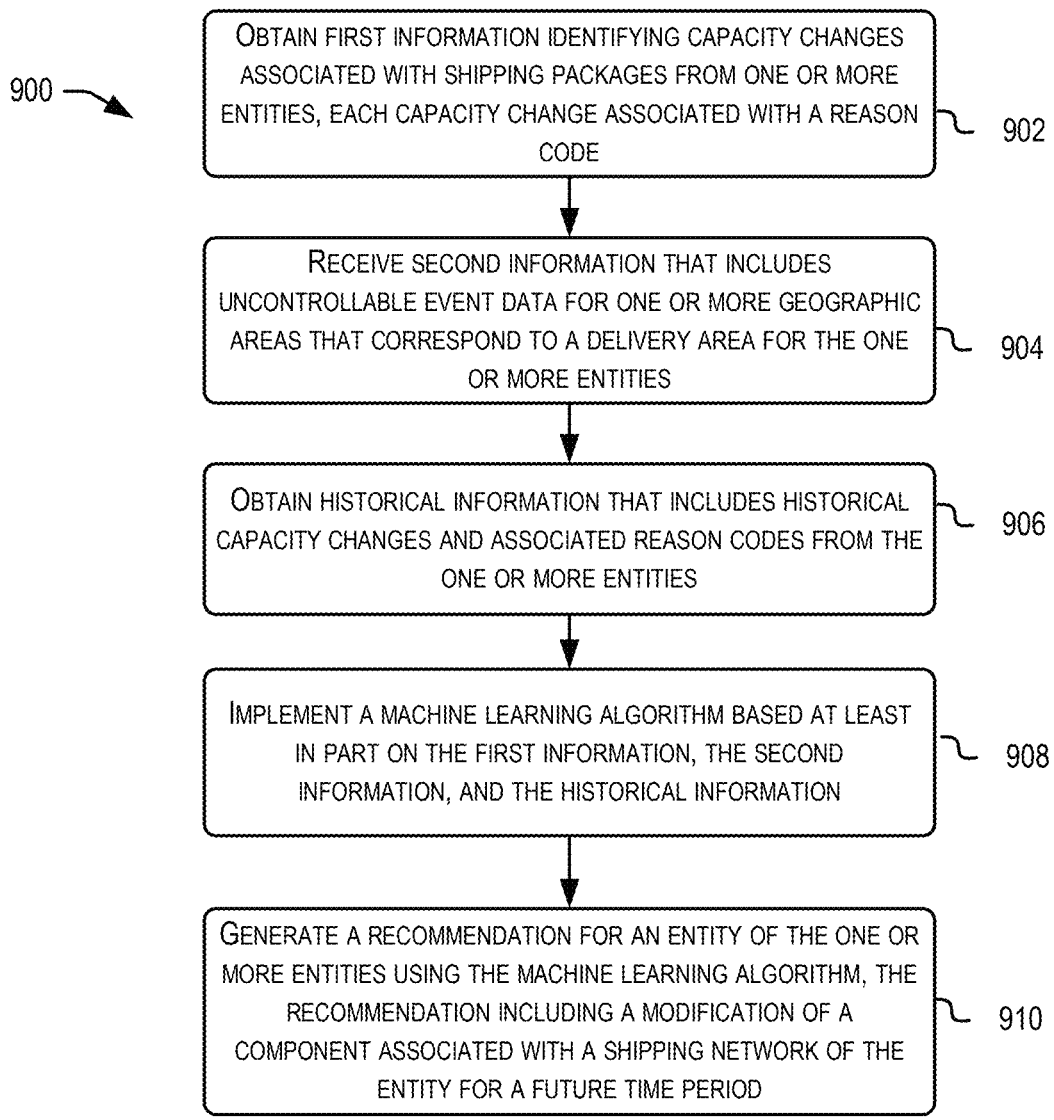
FIG. 9 illustrates an example flow diagram for a capacity recommendation feature, in accordance with at least one embodiment.

FIGS. 8 and 9 illustrate example flow charts for capacity recommendation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the descried operations can be combined in any order and/or in parallel to implement the process.

Additionally, some, any, or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
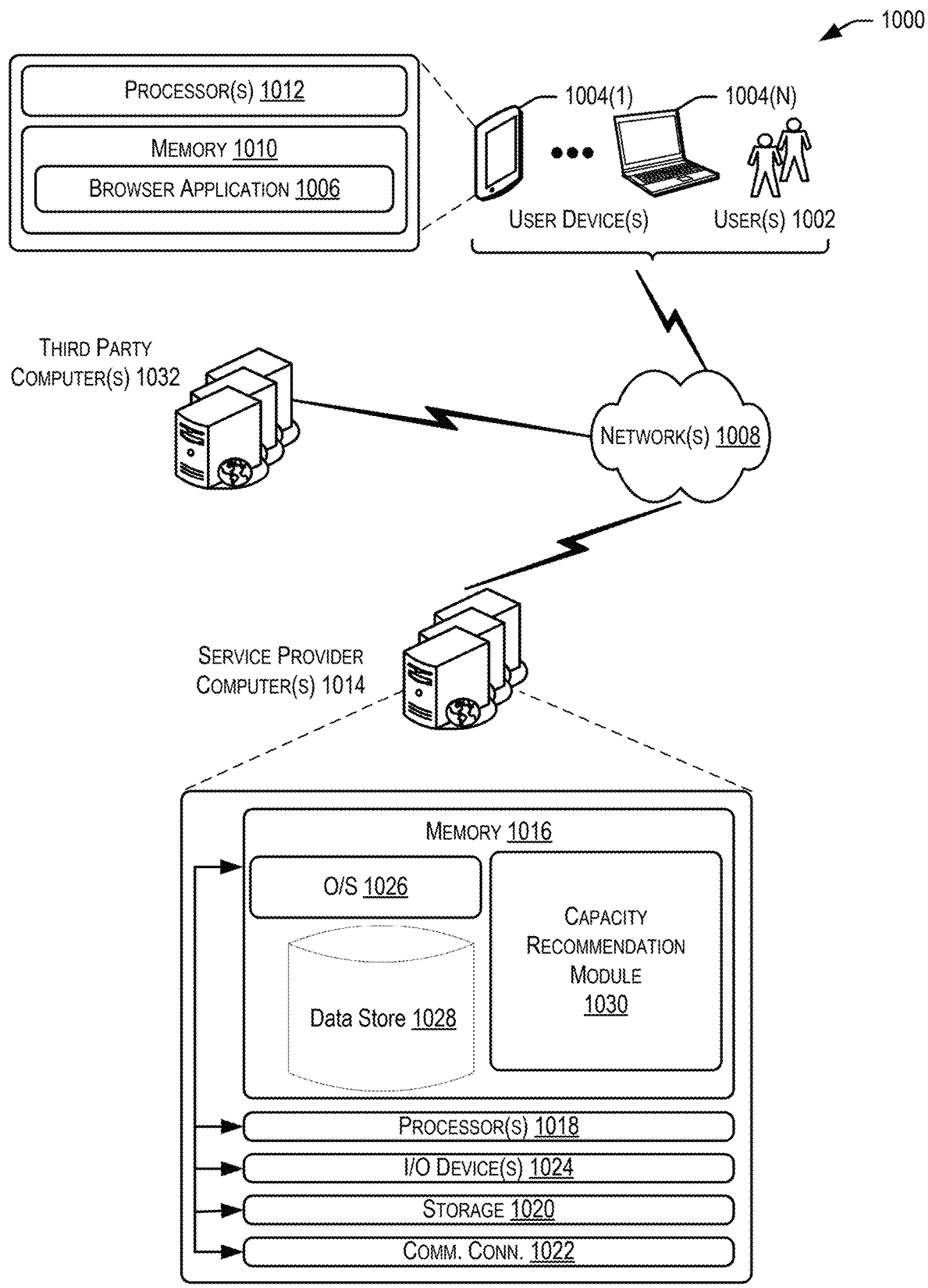
FIG. 10 illustrates an example architecture for implementing a capacity recommendation feature, in accordance with at least one embodiment.

In some examples, the service provider computers (service provider computers 1014) utilizing at least the capacity recommendation module 1030 depicted in FIG. 10 may perform the processes 800 and 900 of FIGS. 8 and 9. In FIG. 8, the process 800 may include obtaining first information identifying capacity changes associated with shipping packages from one or more entities at 802. In embodiments, each capacity change may be associated with a reason code. The process 800 may include receiving second information that includes weather information for one or more geographic areas that correspond to a delivery area for the one or more entities at 804. For example the weather information may correspond to real time weather conditions for the delivery area which may include a county, a city, a state, or a region such as the North East United States. The weather conditions may include emergency conditions or severe weather events such as hurricanes, tornadoes, or earthquakes which would substantially affect delivery conditions for the delivery area and thereby a reduction in delivery capacity. The process 800 may include obtaining historical information that includes historical capacity changes and associated reason codes from the one or more entities at 806. The historical information may be collected, stored, and accessed from previously submitted capacity changes and associated reason codes during a previous time period.

The process 800 may include implementing a machine learning algorithm based at least in part on the first information, the second information, and the historical information at 808. In accordance with at least one embodiment, implementing the machine learning algorithm can include training a supervised or unsupervised machine learning algorithm using the first information, the second information, and the historical information. As described herein, the output of the machine learning algorithm can be used to generate and populate a user interface that presents information about one or more transportation networks associated with the one or more entities, recommendations for changing capacity (including specific levers or components to modify), and responses to queries such as a source for a capacity change. Notifications to adjust a predicted capacity for a future time period may also be generated by the machine learning algorithm and provided to entities based on the machine learning algorithm using the first information, the second information and the historical information.

The recommendations presented by the user interface may be generated by the machine learning algorithm as well. The process 800 can include generating a recommendation for an entity of the one or more entities using the machine learning algorithm at 810. In embodiments, the recommendation may include a modification of a component associated with a shipping network of the entity for a future time period. For example, a recommendation may indicate that a certain entity reduce the total predicted capacity that a facility within an entities' transportation network can handle for a future time period (e.g., next two weeks). The process 800 may include generating instructions for modifying the component based at least in part on the recommendation at 812. For example, the instructions may include new routes for delivery vehicles or delivery entities to utilize. The instructions may be transmitted directly to a user device of a delivery vehicle or delivery entity and modify a current route to the recommended route based on the change in capacity for the transportation network. The process 800 may include transmitting the instructions to an entity computer associated with the entity at 814. For example, the instructions may be transmitted to a computer for implementation that is associated with a sorting center or fulfillment center of the entity. The instructions may be implemented by the entity computer to modify routes utilized by autonomous mobile robots or the layout configuration of packages within a facility.

In FIG. 9, the process 900 may include obtaining first information identifying capacity changes associated with shipping packages from one or more entities at 902. In accordance with at least one embodiment, the first information may include text descriptions for the change in capacity and which do not include a reason code. In such cases, the service provider computers may utilize a natural language algorithm to parse the provided text for reason codes. The natural language algorithm may be configured to assign a different weight to each reason code included in the first information depending on the severity or importance of the reason code. For example, an uncontrollable event reason code such as a weather condition including a tornado may carry greater weight than a controllable event reason code such as a sorting machine being non-functional at a facility. Each capacity change is associated with a reason code. For example, a change in capacity for a given entity may indicate that a lack of attendance is the reason code for the change (reduction) in capacity. The text description for the capacity change or the reason code for the capacity change include in the first information may also include a tag of a controllable event or uncontrollable event. In embodiments, the machine learning algorithm implemented by the service provider computers may generate recommendations which include modifications to components to avoid future controllable event reasons for changing capacity. For example, if a certain facility continually reduces capacity from a predicted capacity because of malfunctions in machines at the facility, a recommendation can be generated to increase maintenance at the facility to avoid future capacity changing events. The process 900 may include receiving second information that includes uncontrollable event data for one or more geographic areas that correspond to a delivery area for the one or more entities at 904.

The process 900 may include obtaining historical information that includes historical capacity changes and associated reason codes from the one or more entities at 906. The process 900 may include implementing a machine learning algorithm based at least in part on the first information, the second information, and the historical information at 908. The process 900 may include generating a recommendation for an entity of the one or more entities using the machine learning algorithm at 910. The recommendation may include a modification of a component associated with a shipping network of the entity for a future time period. For example, the recommendation may include instructions for modifying when delivery vehicles or entities leave a facility associated with the entity or when delivery vehicles return to the facility after completing the delivery of packages according to the change in capacity of another entity within the shipping network. In accordance with at least one embodiment, the service provider computers implementing the capacity recommendation feature may be configured to generate a data object, such as data records for a database or a data stream, that includes the first information, the second information, and the historical information. The data object may be transmitted to a third party computer or the third party computer may be granted access to the data stream. In embodiments, the third party computer may be associated with a data science team that can analyze the data to generate further recommendations, capacity predictions, or modifications to components of a shipping network associated with an entity.

FIG. 10 illustrates an example architecture for implementing a capacity recommendation feature, in accordance with at least one embodiment. In architecture 1000, one or more users 1002 (e.g., carriers, users, consumers, entities, etc.,) may utilize user computing devices 1004(1)-(N) (collectively, user devices 1004) to access a browser application 1006 or a user interface (UI) accessible through the browser application 1006, via one or more networks 1008 to access a user interface for submitting capacity changes, reason codes, or text descriptions of for a change in capacity. In embodiments, the user interface may be generated and maintained by the service provider computers 1014. The "browser application" 1006 can be any browser control or native application that can access and display a network page or other information such as a user interface of a native software application for enabling the presentation of a capacity change recommendation, documents, delivery routes, representation of geographic, carrier capacities, determined values, as well as receive input that includes information about a capacity change and associated reason code for the capacity change provided by an entity. A native software application may include an application or program that has been developed for use on a particular platform (such as an operating system) or a particular device (such as a particular type of mobile device or user device 1004). In embodiments, the user device 1004 may include one or more components for enabling the user 1002 to interact with the browser application 1006. In embodiments, the user device 1004 may include one or more software applications or native software applications such as a carrier application (not pictured). In embodiments, the service provider computers 1014 may provide instructions and content to as well as receive information and input from the carrier application of the user device 1004 via networks 1008. In accordance with at least one embodiment, the browser application 1006 may communicate with the carrier application of the user device based on instructions provided by the service provider computers 1014. For example, new routes, and modifications to an amount of packages to be picked up and delivered, may be transmitted directly to the user device 1004 and carrier application.

The user devices 1004 may include at least one memory 1010 and one or more processing units or processor(s) 1012. The memory 1010 may store program instructions that are loadable and executable on the processor(s) 1012, as well as data generated during the execution of these programs. Depending on the configuration and type of the user devices 1004, the memory 1010 may be volatile (such as random access memory (RAM)) and/or non-volatile (such as read-only memory (ROM), flash memory, etc.). The user devices 1004 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1004. In some implementations, the memory 1010 may include multiple different types of memory, such as static random access memory (SRAM), dynamic random access memory (DRAM), or ROM.

Turning to the contents of the memory 1010 in more detail, the memory 1010 may include an operating system and one or more application programs or services for implementing the features disclosed herein. Additionally, the memory 1010 may include one or more modules for implementing the features described herein including the capacity recommendation module 1030.

The architecture 1000 may also include one or more service provider computers 1014 that may, in some examples, provide computing resources such as, but not limited to, client entities, low latency data storage, durable data store, data access, management, virtualization, hosted computing environment or "cloud-based" solutions, content generation, item transmission portal feature implementation, etc. The service provider computers 1014 may implement or be an example of the service provider computer(s) described herein with reference to FIGS. 1-9 and throughout the disclosure. The one or more service provider computers 1014 may also be operable to provide site hosting, computer application development, and/or implementation platforms, combinations of the foregoing, or the like to the one or more users 1002 via user devices 1004. In accordance with at least one embodiment, the service provider computers 1014 may receive information, such as weather information, from third party computers 1032 via networks 1008 and provide information to the third party computers 1032 via networks 1008. For example, the service provider computers 1014 may provide data objects or access to a data stream to the third party computers 1032 that includes the output of the machine learning algorithm implemented by the service provider computers 1014. In embodiments, the service provider computers 1014 may provide instructions for modifying routes or travel times to the third party computers 1032 that are associated with third party carriers.

In some examples, the networks 1008 may include any one or a combination of many different types of networks, such as cable networks, the Internet, wireless networks, cellular networks, and other private and/or public networks. While the illustrated examples represents the users 1002 communicating with the service provider computers 1014 over the networks 1008, the described techniques may equally apply in instances where the users 1002 interact with the one or more service provider computers 1014 via the one or more user devices 1004 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1014 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1014 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1014 may be in communication with the user device 1004 via the networks 1008, or via other network connections. The one or more service provider computers 1014 may include one or more servers, perhaps arranged in a cluster or as individual servers not associated with one another. In embodiments, the service provider computers 1014 may be in communication with the third party computers 1032 via networks 1008 to receive or otherwise obtain data including third party shipping requirements, historical shipping requirements for a geographic location, carrier capacity information or other information utilized by the capacity recommendation feature described herein.

In one illustrative configuration, the one or more service provider computers 1014 may include at least one memory 1016 and one or more processing units or processor(s) 1018. The processor(s) 1018 may be implemented as appropriate in hardware, computer-executable instructions, firmware, or combination thereof. Computer-executable instruction or firmware implementations of the processor(s) 1018 may include computer-executable or machine-executable instructions written in any suitable programming language to perform the various functions described when executed by a hardware computing device, such as a processor. The memory 1016 may store program instructions that are loadable and executable on the processor(s) 1018, as well as data generated during the execution of these programs. Depending on the configuration and type of the one or more service provider computers 1014, the memory 1016 may be volatile (such as RAM) and/or non-volatile (such as ROM, flash memory, etc.). The one or more service provider computers 1014 or servers may also include additional storage 1020, which may include removable storage and/or non-removable storage. The additional storage 1020 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1016 may include multiple different types of memory, such as SRAM, DRAM, or ROM.

The memory 1016, the additional storage 1020, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1016 and the additional storage 1020 are all examples of non-transitory computer storage media. Additional types of non-transitory computer storage media that may be present in the one or more service provider computers 1014 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1014. Combinations of any of the above should also be included within the scope of non-transitory computer-readable media.

The one or more service provider computers 1014 may also contain communication connection interface(s) 1022 that allow the one or more service provider computers 1014 to communicate with a data store, another computing device or server, user terminals, and/or other devices on the networks 1008. The one or more service provider computers 1014 may also include I/O device(s) 1024, such as a keyboard, a mouse, a pen, a voice input device, a touch input device, a display, speakers, a printer, etc.

Turning to the contents of the memory 1016 in more detail, the memory 1016 may include an operating system 1026, one or more data stores 1028, and/or one or more application programs or services for implementing the features disclosed herein including the capacity recommendation module 1030. In accordance with at least one embodiment, the capacity recommendation module 1030 is configured to implement one or more models or algorithms as described herein including a machine learning algorithm to generate recommendations that include modifications to expected capacity requirements for entities within a shipping network(s) for a future time period. In embodiments, the capacity recommendation module 1030 may utilize first information that includes capacity changes and associated reason codes provided by entities (e.g., user 1002) via user devices (1004) that identifies a reason for a change to expected capacity (e.g., loss of capacity because of equipment failure); second information that includes uncontrollable event data such as weather information for one or more geographic areas that correspond to a delivery area for the delivery entities; and historical information of historically submitted capacity changes and associated reason codes to train the machine learning algorithm. The machine learning algorithm implemented by the capacity recommendation module 1030 may be used to identify trends, correlations, impact, and cause and effects of capacity changes by entities on other entities and their shipping networks. In accordance with at least one embodiment, the capacity recommendation module 1030 may implement the machine learning algorithms to identify a specific component of a shipping network (e.g., truck sizes, number, routes utilized, specific instructions for autonomous mobile robots, etc.,), to modify based on a capacity change indicated by another entity or predicted by the machine learning algorithm. The capacity recommendation module 1030 may be configured to generate and transmit instructions for the modification or to implement the modification to user devices 1004, third party computers 1032, or other computer systems (e.g., entity computers) (not pictured), via networks 1008. In accordance with at least one embodiment, the capacity recommendation module 1030 may be configured to generate a user interface or network viewer that can be presented via user devices 1004 and browser application 1006. The user interface may be configured to present information about the shipping network, other shipping networks, recommendations generated by the machine learning algorithm, sources of capacity changes by other entities, and to provide notifications to operations teams who may be affected by a capacity change either submitted by an entity or predicted by the machine learning algorithm. In embodiments, the capacity recommendation module 1030 may be configured to analyze submitted excepted capacity requirements by entities to determine how likely the entity is to execute such capacity requirements given historic data analysis for the entity and other entities for a future time period. The capacity recommendation module 1030 may be configured to provide a list or information that details the controllable and non-controllable factors that are likely to affect the submitted plans to meet capacity or the capacity requirement itself for the future time period.

Figure 11:
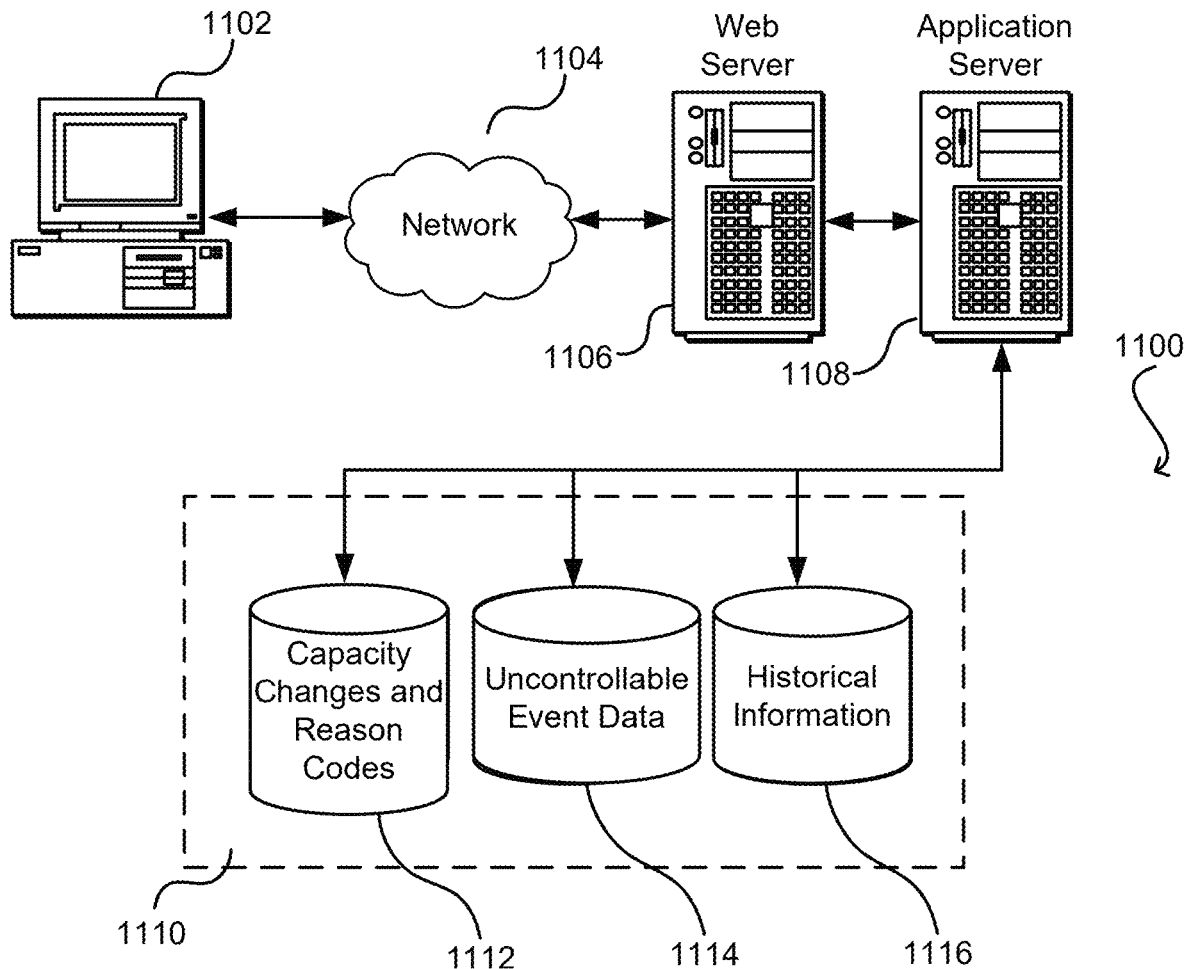
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing capacity changes and reason codes 1112 and historical information 1116, which can be used to train a machine learning algorithm to generate recommendations which include modifications to components of a transportation network associated with an entity as well as capacity changes. The data store also is shown to include a mechanism for storing uncontrollable event data 1114, which can be used for reporting, analysis, or other such purposes such as training the machine learning algorithm as well as generating recommendations for updating capacities for entities associated with a transportation network. The capacity changes and reason codes 1112, historical information 1116, and uncontrollable event data 1114, can be used to generate a user interface which can present information about transportation networks (e.g., health of the network) as well as respond to queries from users. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computer system comprising one or more processors, first information identifying capacity changes associated with shipping a plurality of packages from one or more entities, each capacity change of the capacity changes associated with a reason code that identifies a reason for the capacity change;
    receiving, by the computer system, second information that includes weather information for one or more geographic areas that correspond to a delivery area for the one or more entities;
    receiving third information comprising text associated with the reason for each capacity change;
    determining, based on the text, the reason codes for the capacity changes;
    obtaining, by the computer system, historical information that includes historical capacity changes and associated historical reason codes from the one or more entities;
    implementing, by the computer system, a machine learning algorithm based at least in part on the first information, the second information, the reason code for each capacity change, and the historical information, the machine learning algorithm previously trained using prior capacity changes and associated prior reason codes, prior event data, and the historical information to identify discrepancies between an estimated capacity requirement and a predicted capacity requirement for the one or more entities;
    generating, by the computer system, a recommendation for an entity of the one or more entities using the machine learning algorithm, the recommendation including a modification of an autonomous mobile robot of a fulfillment center associated with a shipping network of the entity for a future time period to accommodate at least one discrepancy of the identified discrepancies, and at least a portion of the autonomous mobile robot modifiable at an entity computer associated with the entity; and
    responsive to the recommendation:
        generating, by the computer system, instructions for modifying the autonomous mobile robot based at least in part on the recommendation, the instructions comprising a layout of the plurality of packages stored in the fulfillment center and routes for the autonomous mobile robot to use to move the plurality of packages to correspond to the layout, the layout of the plurality of packages accommodating the at least one discrepancy;
        transmitting, by the computer system, the instructions to the entity computer associated with the entity;
        modifying at least the portion of the autonomous mobile robot at the entity computer in accordance with the instructions; and
        causing the autonomous mobile robot to operate according to the routes.

2. The computer-implemented method of claim 1, further comprising generating, by the computer system, a user interface configured to be presented on a user device, the user interface further configured to present at least the recommendation for the entity.

3. The computer-implemented method of claim 2, further comprising updating, by the computer system, the user interface to present the third information that identifies a source of a change in capacity for a particular entity of the one or more entities as well as the reason code for the change in capacity, the updating of the user interface in response to receiving input via the user interface.

4. The computer-implemented method of claim 1, wherein the recommendation comprises a further modification of an additional component, the additional component including one or more of a sorting machine, mechanical component of the fulfillment center, a delivery entity route, or a number of delivery entity vehicles.

5. The computer-implemented method of claim 1, wherein accommodating the at least one discrepancy comprises reducing the at least one discrepancy between the estimated capacity requirement and the predicted capacity requirement by storing the plurality of packages according to the layout.

6. The computer-implemented method of claim 1, wherein accommodating the at least one discrepancy comprises complying with the predicted capacity requirement by storing the plurality of packages according to the layout.

7. A non-transitory computer-readable storage medium storing computer-executable instructions that, when executed by a computer system, configure the computer system to perform operations comprising:
   obtaining first information identifying capacity changes associated with shipping a plurality of packages from one or more entities, each capacity change of the capacity changes associated with a reason code that identifies a reason for the capacity change;
   receiving second information that includes uncontrollable event data for one or more geographic areas that correspond to a delivery area for the one or more entities;
   receiving third information comprising text associated with the reason for each capacity change;
   determining, based on the text, the reason codes for the capacity changes;
   obtaining historical information that includes historical capacity changes and associated historical reason codes from the one or more entities;
   implementing a machine learning algorithm based at least in part on the first information, the second information, the reason code for each capacity change and the historical information, the machine learning algorithm previously trained using prior capacity changes and associated prior reason codes, prior event data, and the historical information to identify discrepancies between an estimated capacity requirement and a predicted capacity requirement for the one or more entities;
   generating a recommendation for an entity of the one or more entities using the machine learning algorithm, the recommendation including a modification of an autonomous mobile robot of a fulfillment center associated with a shipping network of the entity for a future time period to accommodate at least one discrepancy of the identified discrepancies, and at least a portion of the autonomous mobile robot modifiable by an entity computer associated with the entity; and
   responsive to the recommendation:
      generating instructions for modifying the autonomous mobile robot based at least in part on the recommendation, the instructions comprising a layout of the plurality of packages stored in the fulfillment center and routes for the autonomous mobile robot to use to move the plurality of packages to correspond to the layout, the layout of the plurality of packages accommodating the at least one discrepancy;
      transmitting the instructions to the entity computer associated with the entity;
      causing the entity computer to modify the portion of the autonomous mobile robot in accordance with the instructions; and
      causing the autonomous mobile robot to operate according to the routes.

8. The non-transitory computer-readable storage medium of claim 7, wherein the computer-executable instructions, when executed by the computer system, further configure the computer system to perform operations comprising determining the reason code for the capacity change based at least in part on a natural language algorithm that uses the third information.

9. The non-transitory computer-readable storage medium of claim 8, wherein the natural language algorithm assigns a weight to the reason code for each capacity change based on an importance of the capacity change.

10. The non-transitory computer-readable storage medium of claim 7, wherein accommodating the at least one discrepancy comprises reducing the discrepancy between the estimated capacity requirement and the predicted capacity requirement by storing the plurality of packages according to the layout.

11. The non-transitory computer-readable storage medium of claim 7, wherein accommodating the at least one discrepancy comprises complying with the predicted capacity requirement by storing the plurality of packages according to the layout.

12. The non-transitory computer-readable storage medium of claim 7, wherein the third information is received from a user device executing an application, the text associated with the reason for each capacity change input at a user interface of the application at the user device.

13. A computer system comprising:
   a memory configured to store computer-executable instructions; and
   a processor in communication with the memory configured to execute the computer-executable instructions to at least:
   obtain first information identifying capacity changes associated with shipping a plurality of packages from one or more entities, each capacity change of the capacity changes associated with a reason code that identifies a reason for the capacity change;
   receive second information that includes uncontrollable event data for one or more geographic areas that correspond to a delivery area for the one or more entities;
   receive third information comprising text associated with the reason for each capacity change;
   determine, based on the text, the reason codes for the capacity changes;
   obtain historical information that includes historical capacity changes and associated historical reason codes from the one or more entities;
   implement a machine learning algorithm based at least in part on the first information, the second information, the reason code for each capacity change, and the historical information, the machine learning algorithm previously trained using prior capacity changes and associated prior reason codes, prior event data, and the historical information to identify discrepancies between an estimated capacity requirement and a predicted capacity requirement for the one or more entities;
   generate a recommendation for an entity of the one or more entities using the machine learning algorithm, the recommendation including a modification of an autonomous mobile robot of a fulfillment center associated with a shipping network of the entity for a future time period to accommodate at least one discrepancy of the identified discrepancies, and at least a portion of the autonomous mobile robot modifiable by an entity computer associated with the entity; and
   responsive to the recommendation:

generate instructions for modifying the autonomous mobile robot based at least in part on the recommendation, the instructions comprising a layout of the plurality of packages stored in the fulfillment center and routes for the autonomous mobile robot to use to move the plurality of packages to correspond to the layout, the layout of the plurality of packages accommodating the at least one discrepancy;

transmit the instructions to an entity computer associated with the entity;

cause the entity computer to modify the portion of the autonomous mobile robot in accordance with the instructions; and cause the autonomous mobile robot to operate according to the routes.

14. The computer system of claim 13, wherein the first information further includes a tag for the capacity change, the tag including at least one of a controllable event or an uncontrollable event.

15. The computer system of claim 14, wherein the modification of the autonomous mobile robot is based at least in part on the tag being the controllable event.

16. The computer system of claim 13, wherein the processor in communication with the memory is further configured to execute the computer-executable instructions to at least generate a data object that includes the first information, the second information, and the historical information.

17. The computer system of claim 16, wherein the processor in communication with the memory is further configured to execute the computer-executable instructions to at least transmit the data object to a third party computer.

18. The computer system of claim 13, wherein the processor in communication with the memory is further configured to execute the computer-executable instructions to at least generate a notification that indicates an update to an estimated capacity for a future time period for a particular entity of the one or more entities based at least in part on a predicted capacity being compared to the estimated capacity, the predicted capacity determined by the machine learning algorithm.

* * * * *